United States Patent
Harvey

(10) Patent No.: US 11,783,159 B2
(45) Date of Patent: *Oct. 10, 2023

(54) METHOD AND DEVICE FOR DETECTING UNAUTHORIZED TRANSFER BETWEEN PERSONS

(71) Applicant: Thomas Danaher Harvey, Rockville, MD (US)

(72) Inventor: Thomas Danaher Harvey, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,928

(22) Filed: Apr. 25, 2022

(65) Prior Publication Data
US 2022/0284258 A1 Sep. 8, 2022

Related U.S. Application Data

(63) Continuation of application No. 17/019,210, filed on Sep. 12, 2020, now Pat. No. 11,341,393, which is a
(Continued)

(51) Int. Cl.
| | |
|---|---|
| *G06M 1/27* | (2006.01) |
| *G06K 17/00* | (2006.01) |
| *G06K 7/10* | (2006.01) |
| *G06K 19/14* | (2006.01) |
| *F41A 17/06* | (2006.01) |
| *G06N 3/084* | (2023.01) |
| *G06V 40/10* | (2022.01) |
| *G06V 40/20* | (2022.01) |
| *G06N 3/044* | (2023.01) |

(Continued)

(52) U.S. Cl.
CPC .............. *G06M 1/27* (2013.01); *F41A 17/063* (2013.01); *G06K 7/10297* (2013.01); *G06K 17/0022* (2013.01); *G06K 19/0711* (2013.01); *G06K 19/14* (2013.01); *G06N 3/044* (2023.01); *G06N 3/084* (2013.01); *G06T 1/0007* (2013.01); *G06V 40/10* (2022.01); *G06V 40/25* (2022.01); *F41A 17/06* (2013.01); *F41A 17/066* (2013.01); *G06N 20/00* (2019.01); *G06T 2207/30236* (2013.01); *G06T 2207/30242* (2013.01)

(58) Field of Classification Search
CPC .......... G06M 1/27; G06V 40/10; G06K 19/14
USPC ....................................... 235/382.5
See application file for complete search history.

(56) References Cited

U.S. PATENT DOCUMENTS 10,282,656 B2 * 5/2019 Harvey ................. G06T 1/0007
2018/0288617 A1 * 10/2018 Robison ................. H04L 63/08
(Continued)

*Primary Examiner* — Ahshik Kim

(57) ABSTRACT

A method of confirming the identity of a person who issued a token to signify eligibility for a privilege. Possession token is confirmed to be by the same person by using sensors in the token which track the movements of the person. A machine learning system is trained to evaluate the sensor data detecting transfer of possession of the token. The state of continuous possession since the token was issued or set to an enabled state is confirmed and the privilege is granted. The method of identity confirmation is used in various contexts such as for to control entry to a location, use of a facility or service. It is also useful to determine continuous possession of a weapon to prevent misuse after the weapon is stolen, dropped or lost. Servers, beacons and outside sources of data or inputs to be measured by the sensor can also be used.

20 Claims, 5 Drawing Sheets

Related U.S. Application Data continuation of application No. 16/370,914, filed on Mar. 30, 2019, now Pat. No. 10,803,375, which is a continuation of application No. 15/828,629, filed on Dec. 1, 2017, now Pat. No. 10,282,656.

(60) Provisional application No. 62/444,841, filed on Jan. 11, 2017.

(51) Int. Cl.
*G06K 19/07* (2006.01)
*G06T 1/00* (2006.01)
*G06N 20/00* (2019.01)

(56) References Cited

U.S. PATENT DOCUMENTS

2019/0014100 A1* 1/2019 Scott .................... H04L 9/3242
2019/0103012 A1* 4/2019 Daoura .............. G08B 21/0247

* cited by examiner

METHOD AND DEVICE FOR DETECTING UNAUTHORIZED TRANSFER BETWEEN PERSONS

CROSS REFERENCE TO RELATED APPLICATIONS

This application is a continuation of U.S. patent application Ser. No. 17/019,210 filed Sep. 9, 2020 which is pending and which is a continuation of U.S. patent application Ser. No. 16/370,914 filed Mar. 30, 2019 which is now U.S. Pat. No. 10,803,375 and which is a continuation of U.S. patent application Ser. No. 15/828,629 filed Dec. 1, 2017 which is now U.S. Pat. No. 10,282,656.

This application claims priority to U.S. Provisional Application No. 62/444,841 filed Jan. 11, 2017. Each patent application identified above is incorporated herein by reference in its entirety to provide continuity of disclosure. Furthermore, where a definition or use of a term in a reference, which is incorporated by reference herein, is inconsistent or contrary to the definition of that term provided herein, the definition of that term provided herein applies and the definition of that term in the reference does not apply.

STATEMENT REGARDING FEDERALLY SPONSORED RESEARCH OR DEVELOPMENT

Not Applicable

BACKGROUND OF THE INVENTION

Field of the Present Invention

The present invention relates to a device to track its possession by an authorized person.

Background Concerning the Need for the Current Invention

Many situations where a substantial number of people are served allow some of the people present to access areas, use or receive things or be granted privileges denied to others. Rather than checking repeatedly to see if the particular person is eligible or authorized, they may be checked one time and then given some token of authorization. If the nature of the situation requires that only the particular person be granted the privilege, the must be a guarantee that the token is being used by the authorized person.

One common way to make this guarantee is to attach the token to the body of the authorized person. An example of this is the common practice of stamping the hands of persons entering a nightclub or sports event with a distinctive stamp. Another example is the wristbands also often used at public events but also in hospitals and for other more serious uses. This method can be cheap and convenient for the venue operator, but has a serious drawback because many people are uncomfortable about having things attached to their bodies. Even if they agree because they want access, it can detract from the experience and reduce the number of persons coming to an event.

Another common way of providing the guarantee that the person accessing the privilege is an authorized person is to collect personal data and to compare the person to the data when the access is required. A simple example of this is to register persons and record their names. The person could then be asked their name when access is required and the name compared to the list of allowed persons. Another example is the practice on cruise ships of photographing passengers and issuing temporary picture ID cards, which must be presented when reboarding the ship. The picture on the card and often a copy in the ships computer is compared to the face of the person wanting to board. A third example is to use a thumbprint scanner both when granting and when exercising the privilege.

Collecting and comparing personal data as described in the paragraph above has its own drawbacks. The process can be slow and expensive. It may require personnel or substantial equipment at may points. If it is not necessary for other reasons, the person whose data must be collected may object to the loss of anonymity.

It is also possible in some situations to prevent exchange of tokens signifying privileges between persons by watching their behavior. That can be very expensive and is often ineffective. People are very good at doing things without being seen and are trained in that in ordinary life. Examples of training and practice in covert exchange of objects include spy movies, activities of kids in front of teachers, secret drinkers, pickpockets and magicians. An implementation with sensors and pattern matching software can detect exchanges in a completely different manner than detection that is done by human watching. This provides the advantage of making the possible detections unintuitive and unfamiliar to a person who wishes to defeat the system.

Background Concerning Existing Technologies Used in Embodiments

Pattern recognition systems and software are available in the market place. One example, the Neural Network Toolbox available with the programming system Matlab available from Mathworks is suitable to implement most of the embodiments in this application. It can generate a neural network pattern recognition engine and provide tools for easily training and operating the network. More complex embodiments and especially embodiments where the purpose of the embodiment requires extreme reduction of false positive and/or negative results may be easier to develop with more advanced but market available tools.

Many other open and proprietary pattern recognition and neural network programming libraries and systems are available. The use of these systems is now widely taught and development of specific applications to identify patterns of sensory input is a widely held skill.

Operating a pattern recognition system starts with of building a recognition engine usually a neural network and compiling it into a runnable version. The basic embodiments described below will usually not need a carefully designed or extensive system. A few layers and a small number of neurons should be sufficient. This can be done with a few statements in the tools described above.

The next task is to acquire a set of input data with enough cases to distinguish between the different input possibilities. This data needs to have known outcomes for the input cases and is used to train the pattern recognition system. For embodiments based on training prior to use of the system a number of cases numbering from a few hundreds to several thousands would be sufficient for ordinary uses. The data can be collected by various means but would ordinary be gathered by recording the sensor data and outcomes as trial users go through as many scenarios as possible.

The training data is applied to the pattern recognition in the training process. This may be more computation intensive than the pattern search process itself so is often done in advance on a one time basis. In other embodiments suitably increased computing power may be employed.

These steps together allow the configuration of pattern search systems to be implemented with standard market available hardware and software and be accomplished by programmers of the usual level of skill in the relevant specialties.

BRIEF SUMMARY OF THE INVENTION

A device and associated methods for determining that the device has or has not been transferred from a person physically possessing it when it was activated. The device is used to determine if the person personally holding it has privileges which were determined to be granted when the device was activated and put into possession by the person. The device works by using at least one sensor on the device to detect movements of the person to which the device has been issued. The measurements from the sensor are passed as inputs to a neural network or other pattern matching machine learning system which has been trained to recognize transfer of the device. The device remembers that the device has detected transfer and controls the granting of the privilege on the basis of that memory.

BRIEF DESCRIPTION OF THE SEVERAL VIEWS OF THE DRAWING

The features and advantages of the various embodiments disclosed herein will be better understood with respect to the drawing in which.

DETAILED DESCRIPTION OF THE INVENTION AND EMBODIMENTS

Definitions

Figure 1:
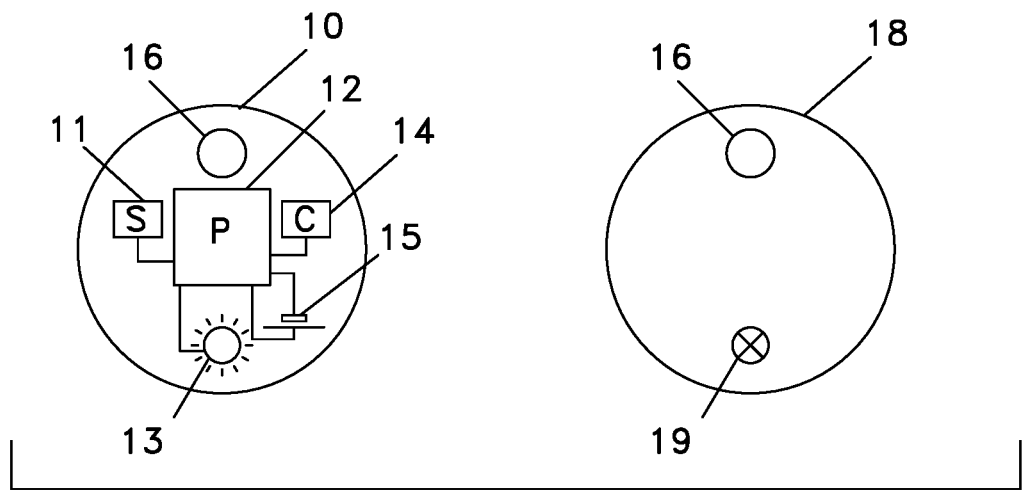
FIG. 1 is a view showing the components of a simple embodiment of an identity token.

The definitions given in this section are intended to apply throughout the specification and in the claims.

A machine learning model is a data structure such as a neural net which has been trained to process inputs to recognize significant patterns.

A privilege is a state which signifies eligibility to do, receive or possess something.

Sensors

There are many kinds of sensors available on the marketplace which can provide information to train a pattern recognition system or to be examined for patterns. Some of these examine the immediate situation at the identity token and measure factors such as acceleration including the direction of gravity, rotation, and even temperature. Others are active or passive devices to measure available information about the environment. They can work by a wide variety of information transmission modes such as infrared, radio, capacitance, visible light, sound or other means.

In many simple embodiments the only sensor necessary would be an accelerometer. Small, fast and cheap three dimensional accelerometers are widely used and available in the market place. They can provide a rich amount of data as a function of movements in each plane and about orientation relative to gravity. In an application where one hundred percent accuracy is not necessary, they will allow simple designs for identification devices. An accelerometer can also be used to communicate with a device by means of moving the device in predetermined patterns to change modes, set parameters, etc.

Gyroscopes which measure the rate of rotation in one or more planes are also available and provide a substantial amount of additional information. They are able to work in a sealed device, as are accelerometers and various other types of sensors. Working in combination with accelerometers, gyroscopes can distinguish angular rotations in vertical and horizontal planes. The patterns of movements in various planes are a rich source of patterns which can be used to distinguish transfers of an object between different persons and mere movements by a single object possessor.

Sound Sensors are helpful in many embodiments. They can detect patterns such as existence of conversations between persons who might transfer a token. They can detect background noise which is correlated with location in many venues. Patterns in background or other noises can be correlated to concealment of a token in places such as a pocket. Such concealment can be correlated to transfer.

Sound patterns can be correlated to location, especially taking into account specific venues. For one example, music in a night club may be muted or of a different quality in restrooms, where improper transfer of a token may be more probable.

Location Sensors providing the token software with locations or data correlated to locations can be useful in many embodiments to detect token transfer. The location data can be from GPS sensors or as a range from some type of beacon or from some resource available in the venue. Locations can also be calculated by various kinds of dead reckoning based on time, acceleration or other factors.

There are many miscellaneous kinds of sensors which would provide information that in various situations is useful to inform patterns for analysis to detect token transfer. This include temperature, air sampling, substance detectors, and others.

Signal Reception as a Sensor and Transmitters for Same.

Beacons can be established in a venue and the distance from the beacon can be a factor in patterns to be identified. There may be specific distance technology employed or simply the available or strength of the signal can be a part of the pattern. Most simply, a weak signal or long distance may be correlated with the token being hidden or being taken where transfer is hoped by the carrier to be unobserved. The source of the signal can be either a beacon designed for that purpose or some other signal source designed for a different purpose.

A server or other outside source of data can be used to update parameters used as inputs by the model evaluation. Changes of privilege conditions, cancellation of privileges and changes in the patterns of movements to be evaluated can all be supplied by such data sources.

Persons holding tokens can also have personal devices which may emit signals such a Bluetooth or WiFi connections or signals related to establishment of connections. A token can monitor such signals as use then as an input to combine with other inputs in analyzing patterns. This can be as simple as the token determining it is possessed by the holder of the personal device or it can be a part of a much more complex pattern search.

User mobile devices have sufficient built in sensors to operate the pattern matcher and other software as an device OS application for many embodiments. Common included sensors include gyroscopes and accelerometers.

States

The Green State denotes that the token is allowing exercise of a granted privilege on the basis of a determination that transfer has not occurred.

The Red State denotes that transfer has been detected or suspected and the privilege is to be denied.

In many applications a substantial number of false entries to the red state may be acceptable. Particularly if there is a convenient means for the token holder to have the state reset. The decision parameters would be set to values that depend upon both the accuracy of the system and the requirements of the application.

Learning State The token may reactivate if it is determined by the sensor that the token is currently possessed by a user from a previous activation. If the sensor is gathering information to return from a red state to a green state, it is said to be in the learning state.

Handoff to additional users may be permitted in certain embodiments. The possible rules for allowed handoff without change to the red state include location, existence of a permission signal and determination that the handoff is to a person granted the privilege.

Pattern Matching Software

Various type of systems for pattern matching have been developed, but implementation as neural nets are rapidly replacing most older methods because of the straightforward method of development and because of effectiveness. Neural nets require substantial amounts of processing for training but once trained are easily implemented in devices for use and very quick to evaluate particular cases.

The problem to be solved in most embodiments of the current invention is to classify at each time the inputs of the available sensors which have been gathered over a portion of the preceding time periods into two classes based on whether or not a suspected transfer of the token has occurred. Because of this structure of the problem an LSTM or GRU recurrent layer is appropriate. This allows for learning to take into account both short and long term time based features of the sensor input.

Implementation of neural networks and other structures for pattern matching is now a well known art. Courses for teaching the methods needed are available online to be audited by anyone at Stanford University and MIT. Course assignments are comparable in complexity to the required effort to implement most embodiments of the methods herein.

An important advantage of pattern matching by neural network is that it is not necessary for the implementer to understand or find patterns. The task in designing such a system is to provide a rich source of inputs that are correlated with the desired states to be distinguished. The correlation does not have to be with each input but can be with an unknown function of many inputs.

Pattern Matching for Acoustics

Methods for methods for detection of acoustic scenes and events have become well known in the artificial intelligence community. Many papers and explanations of such methods are available from the Proceedings of the Detection and Classification of Acoustic Scenes and events 2015 Workshop (DCASE2016) held by the Tampere University of Technology of Finland. The kinds of events to have patterns recognized in the tracking of possession of tokens are of the same structure as acoustic events and can be handled by the same methods. It would often be helpful to make simple adjustments in the methods such as adopting an appropriate time scale and adapting the preprocessing to the sensors used.

DETAILED DESCRIPTION OF THE DRAWING AND CERTAIN EMBODIMENTS

Referring to FIG. 1, an identity token 10 is drawn with the surface cover removed to show the principle internal components. A sensor 11 provides data to a processing chip 12 which implements a pattern recognition engine and performs various other functions. A display 13 shows the state of the recognition, here green, OK or no-fault detected. A communication chip 14 allows communication devices near the chip to control the actual granting of privileges. A power source 15 provides power to the other components. A hole is provided 16 for convenience is retaining the device by means such as a neck ribbon. A second device 18 with is shown with the cover on and with the display 19 in the red, not-OK, or "fault detected" condition.

In a simple preferred embodiment, the sensors are an accelerometer and a gyroscope each with three axes, the power source is a small battery and the communication chip is an RF-id chip with one input that turns off the RF-id when the device is in the red state. The pattern recognition engine is in this embodiment pre-trained to detect patterns associated with exchange of the device between persons. To eliminate the need for an additional input signaling the need to reset the device the accelerometer can be given predefined motions in a reset device to notify the processing chip. The display is a two-color LED which signifies the red and green states with the corresponding colors.

Figure 2:
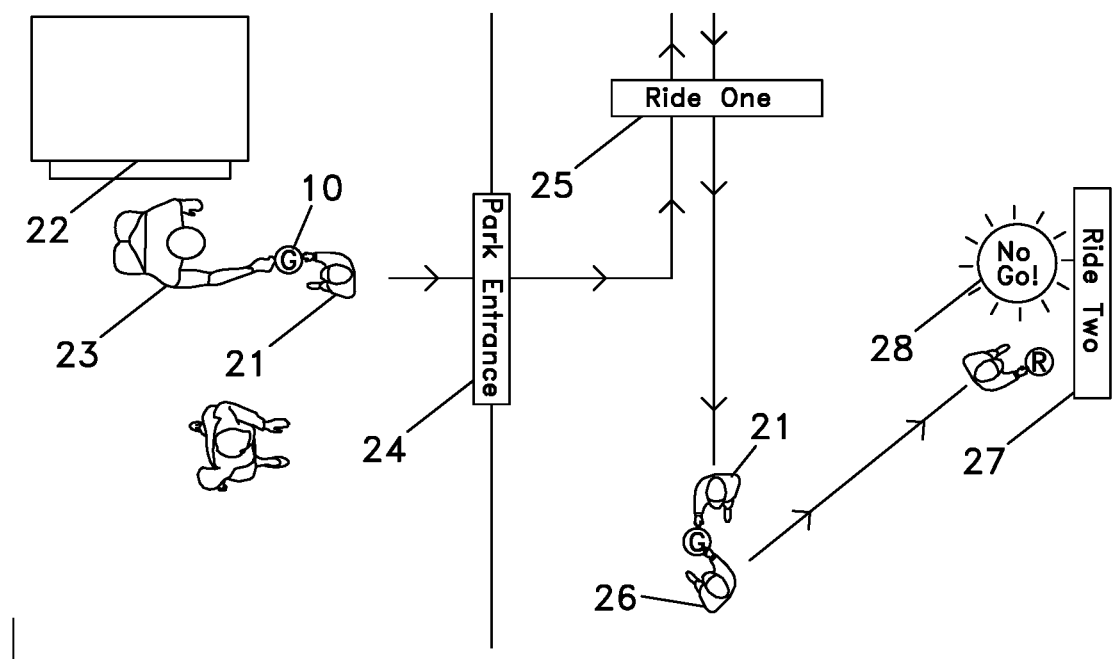
FIG. 2 is plan view of a simple set of operations and procedures comprising a simple embodiment.
Figure 3:
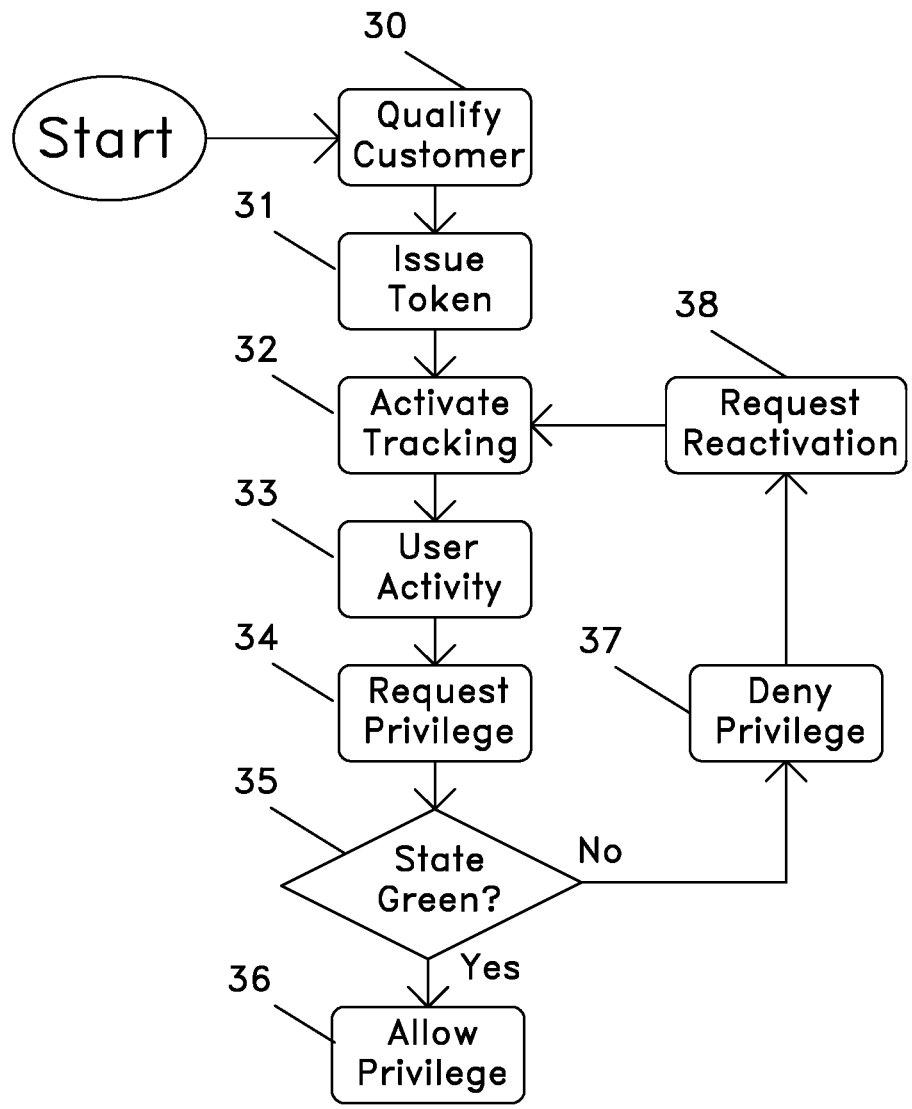
FIG. 3 is a diagram of the steps in using the embodiment of FIG. 2.

Referring to FIG. 2, an embodiment is shown to show how the identity token 10 of FIG. 1 can be used to control the activities and privileges allowed to different children at an amusement park. The activities allowed to a particular child are assumed to vary based on a potentially complex combination of criteria including the child's age, physical size, parental permissions, and payment of various fees. A child 21 is vetted at an entrance window 22 where the parent 23 provides information and parental permission and buys rights to activities. The child is given the identity token 10 provided to the parent at the window. The child enters through a gate 24 that makes checks by means of the communication chip (14 see FIG. 1). The child is allowed onto a ride through another gate 25. After leaving the ride the first child hands the identity token to a friend 26 who hasn't paid for that class of rides. The identity token 10 detects through its pattern recognition engine that the chip has been transferred and enters the red state. The second child attempts to enter another ride of that class 27 but is denied entrance, which is Referring to FIG. 3, a diagram of the process of using the embodiment of FIG. 2 is shown. The identity device or token (10 of FIGS. 1 and 2) contains a processor which is programmed to identify the pattern of sensor inputs signifying transfer of possession of the token. A customer pays, presents documents, executes permissions or does other actions in the process of qualifying 30 for the privilege denoted by the token. The venue issues 31 a token to the customer. In the scenario depicted in this embodiment the customer is a parent who hands the token to a child who is to enjoy the amusements authorized by the token. Depending on the embedded software in the token, the child may be in a less sophisticated embodiment be required to maintain contact with the token at all times or in a more sophisticated embodiment may be able to put the token in a backpack which can be taken off but not worn by anyone else. The token is activated 32 and begins tracking possession by the child. The activation can be by time from the issuance, by a signal sent by the venue, by passing through the entry gate (24 of FIG. 2), by pressing a button on the token, by analysis of a pattern of actions sensed by the token or by some other appropriate means. The state of the token is set to "Green" signifying that the possessor of the token is entitled to the controlled privilege(s).

The user then engages in activities 33 which may not allow supervision by the venue other than by the sensors of the token. The function of the token is to determine if the token remains in the possession of the same user. The sensors pass information to the pattern matching computer and if no transfer is detected the token remains in a "Green" state. If the pattern matching software deems a transfer has been made the state is set to "Red." When the user wants to use a controlled privilege, there is a checking of the state of the token 35. This can be visual by venue personnel or by some automated means such a video scanning or communication by the token to an appropriate reader. If the state is "Green" then the privilege is allowed 36. If the state is "Red" than the privilege is denied. In this particular embodiment, the user is sent back to the entrance window (22 of FIG. 2) where the token may be reactivated after appropriate explanations or other vetting.

Figure 4:
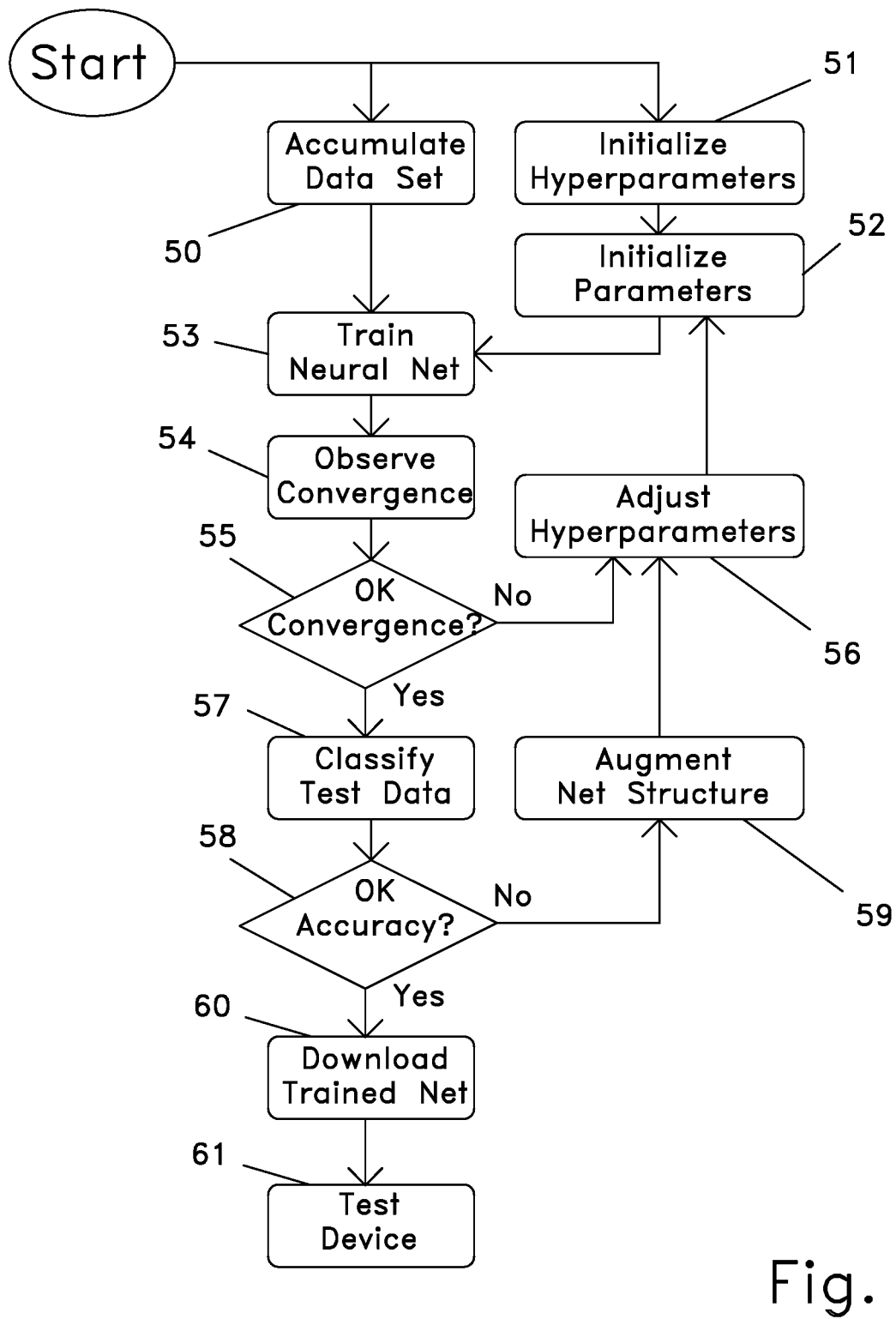
FIG. 4 is a diagram of the steps in developing and implementing the pattern matching software of the embodiment of FIG. 2.

Referring to FIG. 4, a diagram of the process for developing the pattern matching software for the embodiment of FIG. 2 is shown. The software to be developed is a recurrent neural net with an input layer, a recurrent layer, a additional fully connected hidden layer and an output layer. Other more complex structures are also easily implemented but this structure would be sufficient for the low level of accuracy needed in this embodiment.

The first step of the development is to accumulate 50 a data set for training and testing. A device is constructed similar to that of FIG. 1 is used but the processor is programmed to collect data from the sensors (11 of FIG. 1) and transmit it via the communication module (14 of FIG. 1) to an outside data collection system. A number of different persons handle the token device and at various times transfer it to another person. The transfer is reported by an observer to the data collection device or can be self-reported by a person handling the device. As many as possible scenarios and situations are included. In this embodiment, where high accuracy is not needed there is no need for extensive efforts to make the covered modes of transfer and other aspects of the scenarios be comprehensive. In other more critical embodiments more care in data collection design would be required. A data set with a thousand or so collection intervals with about half of them having possession transfers should be sufficient for non-critical embodiments such as here described. The data is divided into two sets with a larger portion for training and a smaller portion for accuracy testing. This is considered labeled data because it contains both input (sensor) data and the desired output for that data (presence or absence of transfer).

In this and related embodiments, a step in the development which might be started in parallel with data collection is the design of an appropriate neural network. The sizing of the layers and the setting of various factors in the neural net which are in addition to the factors and values (parameters) that are adjusted in training are collectively referred to as hyperparameters to distinguish them from the "parameters" which are adjusted in training the neural network. The hyperparameters are initialized 51 to appropriate values. In some systems that are taught hyperparameters are adjusted during the course of training but are distinct from trainable parameters because the adjustments are on the basis of the progress of the training rather than being direct functions of the data.

The next step is to initialize 52 the parameters which are to be trained. Appropriate initialization is necessary for reasonably rapid convergence of the neural net. A number of techniques are taught to product an initial set of values which produced good training progress.

The network is then trained 53 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally the output of the network is used to back propagate through the network to provide further input to the adjustments. The items in the training portion of the dataset are used repeatedly while the convergence of the network is observed 54 by processes in the training data processor.

If the convergence is judged 55 not to be adequate the training is stopped, the hyperparameters are adjusted 56, the neural network is reinitialized and the training process is repeated until satisfactory convergence is obtained. The smaller portion of the data set which has been retained and not used for training is then passed 57 through the neural network (classified) and the output is checked 58 for accuracy. If accuracy is not sufficient for the goals of the particular system being developed then the net structure is made larger 59 and the training process is repeated until satisfactory accuracy is obtained.

The trained neural network is then downloaded 60 to the target device, which is then ready for system testing 61.

Figure 5:
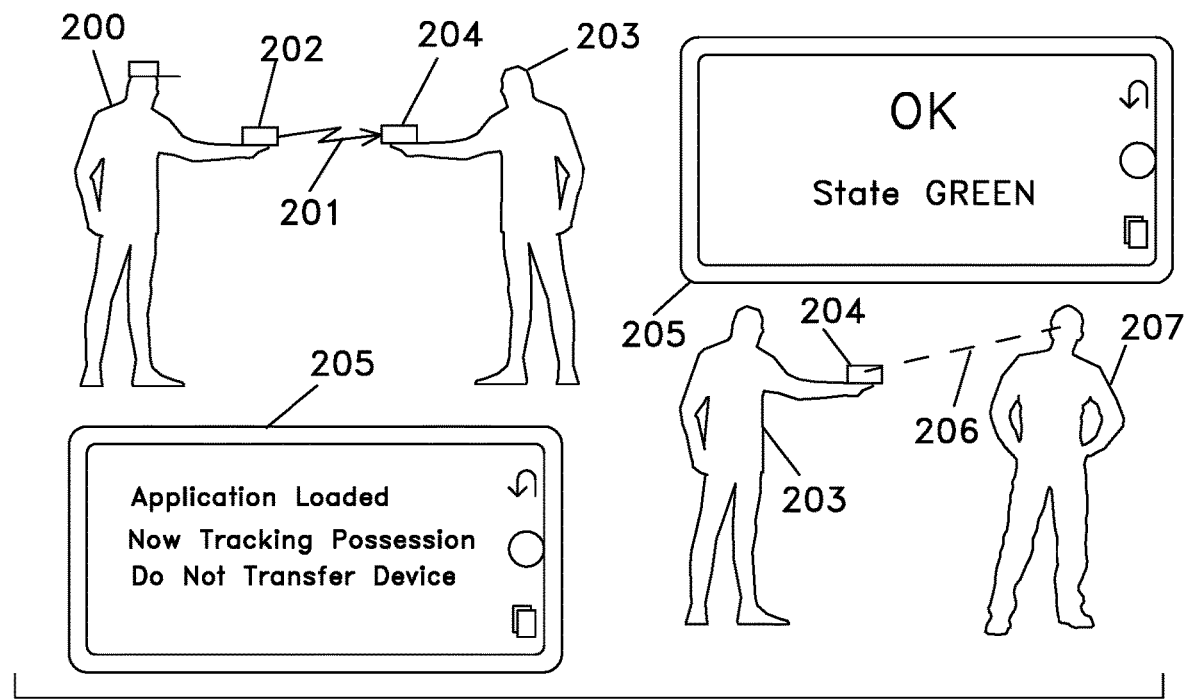
FIG. 5 shows an implementation on a user's own mobile device.

Referring to FIG. 5 an embodiment is shown implemented with the aid of an application (app) on the users own mobile device or smartphone. The device functions as the token after it receives an authorization. An official 200 working at a venue where privileges are to be controlled transmits a message 201 from his device 202 to a user 203 carrying a mobile device 204. A previously downloaded application is running of the device 204 and uses the message to enter a green state which allows the privileges. The screen of the device 205 indicates that the device is now tracking transfers.

The user's mobile device 204 now uses its sensors to track potential transfers of the device which remains in the green state until the pattern matching software in the device determine that the device has been or may have been transferred to another person. When the user 203 wants to exercise a controlled privilege the screen of the device 205 is displayed. It shows the state (here green) and exercise of the privilege is allowed. The screen may be observed 206 by personnel 207 of the venue or it may be checked by an automatic means such as a video scanner with image recognition software.

Figure 6:
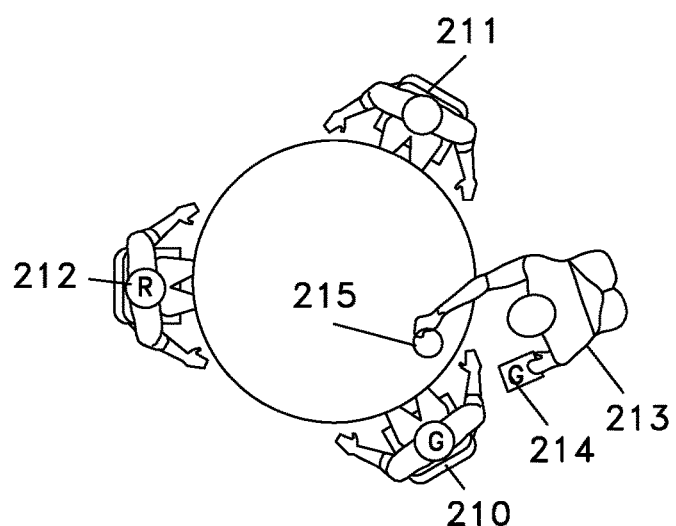
FIG. 6 shows an implementation to ensure that only persons of suitable age are given alcoholic beverages.

Referring to FIG. 6 an embodiment is shown of a venue where alcoholic beverages are served. To ensure that beverages are only given and consumed by persons of suitable age, when ID checks are made at the door a token is given to eligible persons. The token with its sensors and pattern matching system determines that it is still in the possession of the person to whom it was issued. The token is able to communicate its presence and red or green status with a scanner to allow the venue management to check compliance with the age rule.

In the depicted scenario three customers are seated at a table requesting service of alcoholic beverages. Customer 210 has been vetted for age and has a token which is in the green state because the customer has continuously had possession since it was issued and activated. Customer 211 had a token but gave it to underage Customer 212, who therefore has a token in the red state. Customer 211 does not have a token at all. Waiter 213 is checking eligibility of customer 210 with a scanner 214. Customer 210 is eligible and is being served 215. When customers 211 or 212 request service, they will not be found eligible and will be restricted to ordering non-alcoholic beverages. This scanner in one embodiment is an application on the electronic tablet used by the waiter to take orders. It communicates with the tokens with a radio system such a Bluetooth. In the depicted case the nearest token is found to be in the green state.

The scanner may be obvious to the customers as shown here in cases where the venue wants to make enforcement of the age rule obvious or it may be hidden and only visible to staff in other cases. In some implementations the customers own device 204 may implement the function of sensing by the token and the function of the token signifying the authorization of a privilege may be in another object. That object in the scenarios of FIG. 6 would be the possession of the beverage and the sensors and operation of the machine learning model would be to track transfer of the possession of the beverage.

Figure 7:
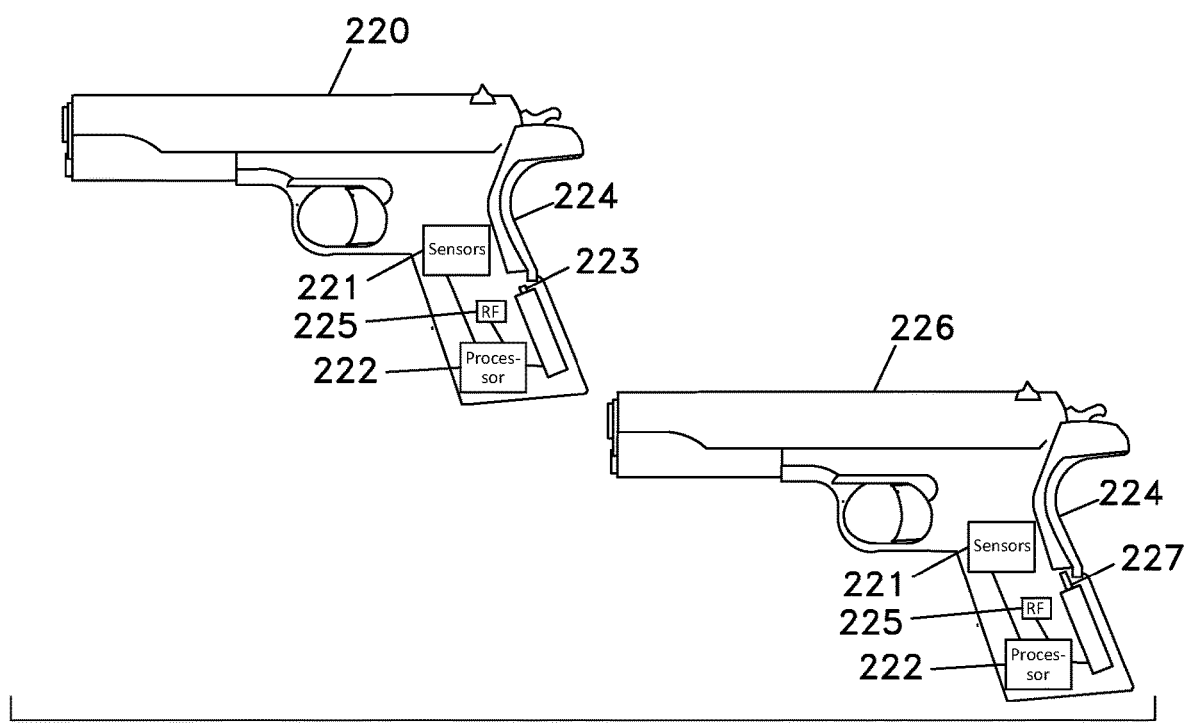
FIG. 7 shows an implementation to ensure that a firearm is only used by the person carrying it.

Referring to FIG. 7 an embodiment is shown where the identification token built into a firearm. The firearm 220 is in the green state and can be discharged. Sensors 221 work with a processor 222 to perform the functions of an identity token and when the processer determines by pattern matching that no transfer has occurred the token remains in the green state. An output of the processor retracts a mechanical pawl 223 which in the extended state would prevent a grip safety 224 of the firearm from being depressed and allowing discharge. In the particular embodiment depicted an RF module 225 puts the token into the green state upon receipt of an authorization when the firearm user takes possession of the firearm. The RF module could also do other functions such as reporting the state of the token or sending sensor data to be further examined. In some embodiments all or part of the pattern matching may be offloaded via the RF module and performed by a separate processor. In that case the complete identity token could be looked at as comprising the components mounted in the firearm as well as the outside processor and communication link. The second depiction of the firearm 226 in FIG. 12 shows the same firearm with the pawl 227 extended. This prevents depression of the grip safety 224 and discharge of the firearm. The pattern matching process has determined a transfer has occurred and placed the token in a red state. This will continue until a reset process occurs by means of the RF link or in some other implementation.

This embodiment works to prevent unauthorized use of the firearm after it has left control of the authorized user. The training set for a neural net for this token would normally be focused on the type of transfers feared for firearms. For example, they would include having the firearm grabbed by someone other than the authorized user and leaving the firearm in a bathroom stall. In a more tightly focused case an additional sensor could determine that the firearm had left the carriers holster. The identification token as an additional output which serves to disable discharge of the firearm when the chips is in a particular "red" state. The token is trained to detect transfers of possession, especially those where the firearm is taken forcefully from the authorized person and those where the forearm is left unguarded and picked up by an unauthorized person. A short range communication link resets the chip when it is in the specific holster worn by the authorized person.

I claim:

1. A method of confirming identity comprising:
   (a) selecting a first person to be identified as having received the selection wherein the first person has possession of a device comprising a sensor;
   (b) activating the device on the basis of confirmation that the first person has possession of the device; and
   (c) evaluating data from the sensor with a machine learning model trained to detect probable transfer of the device to a second person based on the data from the sensor to make a determination that the device has probably been transferred to the second person.

2. The method of claim 1 wherein:
the determination is partially on the basis of the location of the device.

3. The method of claim 1 wherein:
the determination is partially on the basis of proximity to a beacon.

4. The method of claim 1 wherein:
the determination is partially on the basis of data received from a sensor located away from the device.

5. The method of claim 1 wherein:
the identity of the first person is changed on the basis of at least one of a signal and a measurement by a sensor.

6. The method of claim 1 wherein:
the device comprises a function which has its use conditioned on the determination.

7. A method of confirming identity comprising:
   (a) selecting a person to be identified as having received the selection wherein the person has possession of a device comprising a sensor to track movements of the device;
   (b) activating the device on the basis of confirmation that the first person has possession of the device; and
   (c) evaluating data from the sensor with a machine learning model trained to detect probable transfer of the device away from the person based on the data from the sensor to make a determination that the device is probably no longer in the possession of the person.

8. The method of claim 7 wherein:
the determination is partially on the basis of the location of the device.

9. The method of claim 7 wherein:
the determination is partially on the basis of proximity to a beacon.

10. The method of claim 7 wherein:
wherein the determination is partially on the basis of data received from a sensor located away from the device.

11. The method of claim 7 wherein:
the identity of the person is changed on the basis of at least one of a signal and a measurement by a sensor.

12. The method of claim 7 wherein:
the device comprises a function which has its use conditioned on the determination.

13. A method of confirming identity comprising:
   (a) confirming that a person has physical possession of a device, wherein the device comprises a sensor to detect conditions in the vicinity of the device and the device comprises a machine learning model trained to identify probable location of the device being away from the person;

(b) setting a state of the device to a first value on the basis of the confirmation, (c) evaluating inputs from the sensor with the machine learning model and setting the state of the token the device to a second value on the basis of the evaluation when the evaluation determines that the location of the device is not in the vicinity of the person; and (d) determining that the person has probable possession of the device when state is set to the first value and that the person does not have probable possession of the device when the state of the device is set to the second value.

14. The method of claim 13 wherein:

when the device receives a signal the state of the device is set to the first value.

15. The method of claim 13 wherein:

when the device fails to receive a signal from a beacon the device is set to the second value.

16. The method of claim 13 wherein:

the determination is partially on the basis of the location of the device.

17. The method of claim 13 wherein:

the determination is partially on the basis of proximity to a beacon.

18. The method of claim 13 wherein:

the determination is partially on the basis of data received from a sensor located away from the device.

19. The method of claim 13 wherein:

the identity of the person is changed on the basis of at least one of a signal and a measurement by a sensor.

20. The method of claim 13 wherein:

The device comprises a function which has its use conditioned on the determination.

* * * * *